(12) United States Patent
Alecu et al.

(10) Patent No.: US 7,861,536 B2
(45) Date of Patent: Jan. 4, 2011

(54) EJECTOR CONTROLLED TWIN AIR SOURCE GAS TURBINE PRESSURIZING AIR SYSTEM

(75) Inventors: Daniel T. Alecu, Toronto (CA); Dean Carpenter, Milton (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 1016 days.

(21) Appl. No.: 11/389,254

(22) Filed: Mar. 27, 2006

(65) Prior Publication Data

US 2007/0243811 A1    Oct. 18, 2007

(51) Int. Cl.
*F02C 7/12* (2006.01)
(52) U.S. Cl. .......................................... 60/806; 60/785
(58) Field of Classification Search .............. 60/784, 60/785, 806; 415/115–117, 176; 417/76, 417/84, 89
See application file for complete search history.

(56) References Cited

U.S. PATENT DOCUMENTS

| 2,584,899 | A | * | 2/1952 | McLeod | 415/115 |
| 4,182,117 | A | * | 1/1980 | Exley et al. | 60/785 |
| 4,542,623 | A | * | 9/1985 | Hovan et al. | 60/226.1 |
| 4,761,947 | A | * | 8/1988 | Hennecke et al. | 60/806 |
| 5,287,694 | A | * | 2/1994 | Davis et al. | 60/785 |
| 6,065,282 | A | * | 5/2000 | Fukue et al. | 60/39.182 |
| 6,128,896 | A | * | 10/2000 | Saiz | 60/39.183 |
| 6,412,270 | B1 | | 7/2002 | Mortzheim et al. | |
| 6,668,553 | B1 | | 12/2003 | Ghizawi | |
| 7,124,590 | B2 | * | 10/2006 | Hoff et al. | 60/785 |
| 7,162,876 | B2 | * | 1/2007 | Hoff et al. | 60/785 |
| 2003/0046938 | A1 | | 3/2003 | Mortzheim et al. | |
| 2003/0205049 | A1 | | 11/2003 | Anderson et al. | |
| 2006/0179847 | A1 | * | 8/2006 | Hoff et al. | 60/785 |
| 2007/0125092 | A1 | * | 6/2007 | Wolfe et al. | 60/782 |

* cited by examiner

*Primary Examiner*—Michael Cuff
*Assistant Examiner*—Phutthiwat Wongwian
(74) *Attorney, Agent, or Firm*—Ogilvy Renault LLP

(57) ABSTRACT

A passive pressurizing air system for a gas turbine engine includes a flow path for directing an air flow having a low temperature and low pressure, extending through a cavity to a pressurized area of the engine. The cavity contains pressurized air having a high temperature and high pressure. An air flow mixing apparatus is provided for adding the pressurized air from the cavity into the flow path to provide a mixed air flow having an intermediate temperature and intermediate pressure.

8 Claims, 4 Drawing Sheets

EJECTOR CONTROLLED TWIN AIR SOURCE GAS TURBINE PRESSURIZING AIR SYSTEM

TECHNICAL FIELD

The invention relates generally to gas turbine engines and more particularly, to an improved twin air source gas turbine pressurizing air system.

BACKGROUND OF THE ART

Pressurizing air systems within gas turbine engines provide bleed air under pressure for many purposes including supplying auxiliary power, cooling air, etc. A pressurizing air system may extract bleed air from a compressor of the engine at more than one stage thereof to obtain air flows having different temperatures and pressures, in order to meet requirements for different purposes within the engine. However, for gas turbine engine operations the bleed airflow changes in both temperature and pressure at the individual stage ports of the compressor. For example, the temperature and pressure of the bleed air at the individual stage port of the compressor increase when the engine is operated at a full power level in contrast to an idling condition. In another example, as the demand of a bleed airflow extracted from a particular stage port of the compressor increases, the air pressure and temperature delivered from this particular stage port of the compressor will decrease. All these factors will result in fluctuations and variations causing transient thermal stresses on the engine components and transient rubbing (pinch point) in the non-contact air and air/oil seals.

Accordingly, there is a need to provide an improved pressurizing air system for gas turbine engines to provide bleed airflows with relatively stable temperatures and pressures under most engine operating conditions.

SUMMARY OF THE INVENTION

It is therefore an object of this invention to provide a twin-air source pressurizing air system for gas turbine engines in order to provide relatively stable bleed airflows.

In one aspect, the present invention provides a passive pressurizing air system for a gas turbine engine which comprises a low pressure source of air and a high pressure source of air. An ejector is located in a cavity in fluid communication with the high pressure source of air. The ejector has a motive flow inlet thereof in fluid communication with the cavity, a secondary flow inlet thereof connected to the low pressure source of air and an outlet thereof connected to a pressurized area of the engine for delivery of a mixed air flow from the high and low pressure sources of air thereto.

In another aspect, the present invention provides a passive pressurizing air system for a gas turbine engine which comprises a flow path for directing an air flow having a first temperature and a first pressure from a pressure stage of a compressor of the engine to a pressurized area of the engine. The flow path extends through a cavity containing pressurized air having a second temperature and a second pressure greater than the respective first temperature and first pressure. Means are provided for adding the pressurized air from the cavity into the flow path to provide a mixed air flow having a temperature and a pressure intermediate to the first and second temperatures and the first and second pressures. The mixed air flow flows along the flow path downstream of the cavity, to the pressurized area of the engine.

In a further aspect, the present invention provides a method for reducing temperature variation of a pressurized air supply to a pressurized area of a gas turbine engine, which comprises directing a first air flow having a low temperature thereof from a low pressure source of air associated with the engine, to the pressurized area of the engine; and adding a second air flow having a high temperature thereof from a high pressure source of air associated with the engine, into the first air flow to provide a mixed pressurized air supply having an intermediate temperature thereof, to the pressurized area of the engine in a manner in which a ratio of energy distributed by the added second air flow in the mixed pressurized air supply varies to compensate for variations in the first air flow, thereby reducing variations in the intermediate temperature of the mixed pressurized air supply when the low temperature of the first air flow varies.

Further details of these and other aspects of the present invention will be apparent from the detailed description and drawings included below.

DESCRIPTION OF THE DRAWINGS

Reference is now made to the accompanying drawings depicting aspects of the present invention, in which.

DETAILED DESCRIPTION OF THE PREFERRED EMBODIMENTS

Figure 1:
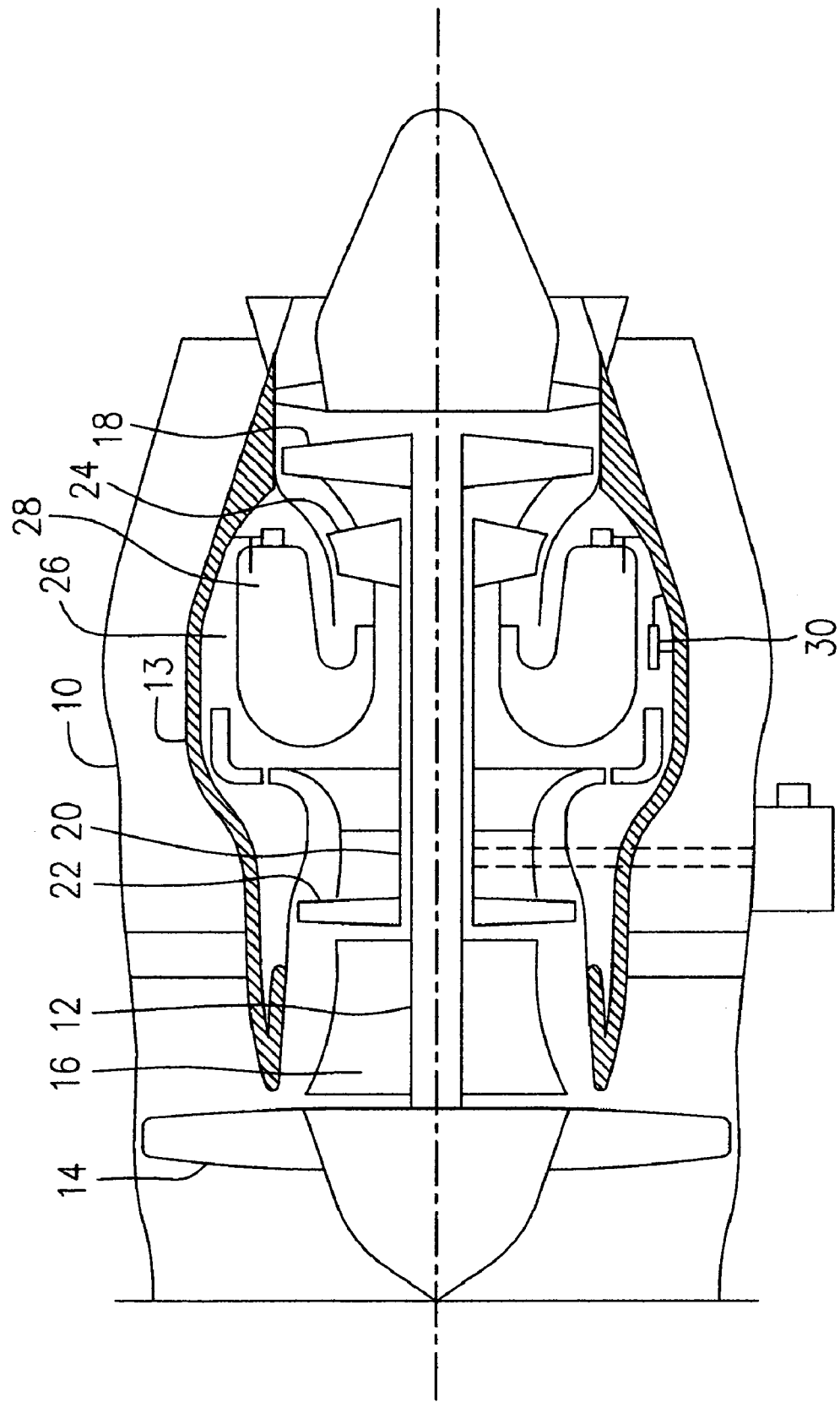
FIG. 1 is a schematic cross-sectional view of a turbofan gas turbine engine as an example illustrating an application of the present invention.

Referring to FIG. 1, a gas turbine engine incorporating an embodiment of the present invention is presented as an example of the application of the present invention and includes a housing or nacelle 10, a core casing 13, a low pressure spool assembly seen generally at 12 which includes a fan assembly 14, a low pressure compressor assembly 16 and a low pressure turbine assembly 18, and a high pressure spool assembly seen generally at 20 which includes a high pressure compressor assembly 22 and a high pressure turbine assembly 24. The core casing 13 surrounds the low and high pressure spool assemblies 12 and 20 in order to define a main fluid path (not indicated) therethrough, including a chamber 26 containing and surrounding a combustor 28. An air flow mixing apparatus 30 according to one embodiment of the present invention is located in the chamber 26 to be used for a twin-air source air pressurizing system of the gas turbine engine.

Figure 2:
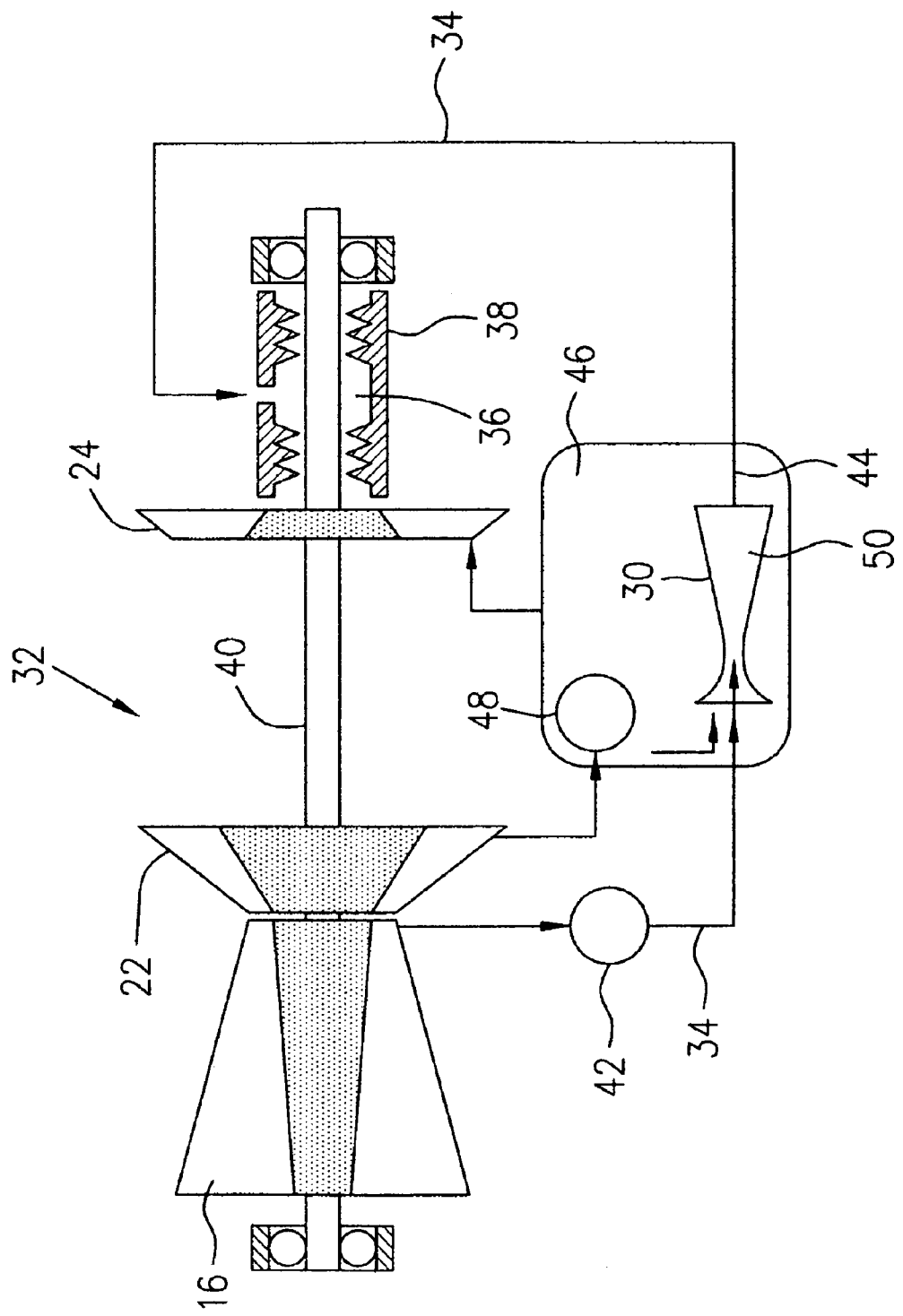
FIG. 2 is a schematic illustration showing a twin-air source pressurizing air system, as one embodiment of the present invention illustrated in the engine of FIG. 1.

Reference is now made to FIGS. 1 and 2. The low and high spool assemblies 12 and 20 of FIG. 1 are simplified in FIG. 2 for convenience of description. The twin-air source pressurizing air system is schematically illustrated and indicated generally by numeral 32 which includes an air flow path 34 connected to a low pressure source of air for example 2.5 P air from a stage of the low pressure compressor assembly 16.

The air flow path 34 extends to one or more pressurized areas 36 of the engine, for example a space defined between labyrinth seal 38 and the rotor shaft 40 located downstream of the turbine assembly 24. The air flow mixing apparatus 30 is incorporated into and thus forms part of the air flow path 34.

The low pressure compressor assembly 16 as the low pressure source of air, provides an air flow having relatively low pressure and low temperature with respect to the pressurized air provided by the high pressure compressor assembly 22 as a high pressure source of air for the engine. The air flow extracted from the stage of the low pressure compressor assembly 16 which is represented by stage port 42, is directed by the air flow path 34 to the pressurized area 36 for cooling or providing purging flow to the labyrinth seal 38 and other components downstream of the turbine assembly 24 which are located in a very high temperature environment.

Nevertheless, the air flow extracted at the stage port 42 of the low pressure compressor assembly 16 varies during various power setting conditions of the engine, the flight regime and customer bleed air demand. Variations in temperature and pressure of the air flow delivered to the pressurized area 36 accompany variations in the air flow. These variations cause transient thermal stresses on the engine components and transient rubbing (pinch point) in the non-contact air and air/oil seals.

Figure 3:
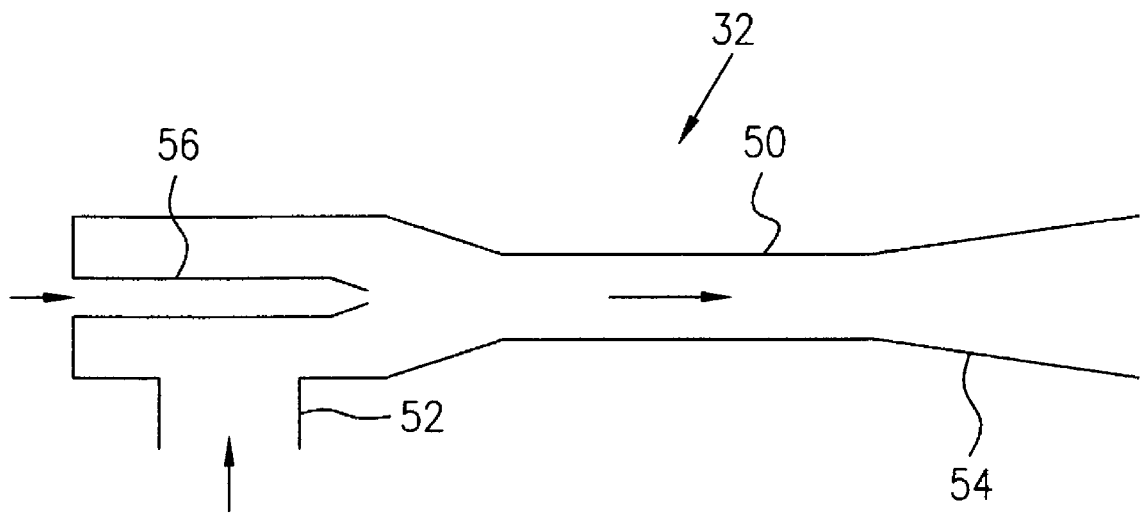
FIG. 3 is a schematic illustration of an ejector used in the embodiment of FIG. 2.

Referring to FIGS. 2 and 3 and according to an embodiment of the present invention, the air flow path 34 preferably includes a segment of a pipeline 44 extending through a cavity 46, for example, an annular chamber defined by the core casing 13, containing and surrounding the combustor 28 as illustrated in FIG. 1. The cavity 46 is in fluid communication with a stage of the high pressure compressor assembly 22 via a high pressure stage port 48. High pressure air such as P3 air is therefore introduced into the cavity 46 for participating in combustion in the combustor 28 to generate combustion gases to drive the high pressure and low pressure turbine assemblies 24, 18, as illustrated in FIG. 1 (only high pressure turbine 24 is shown in FIG. 2). This high pressure air filled in the cavity 46 has a temperature and a pressure greater than the temperature and pressure of the low pressure air delivered at the low pressure stage port 42. Although the temperature of the high pressure air delivered at the high pressure stage port 48 also varies depending on the rotational speed of the high pressure compressor assembly 22, the engine is designed to deliver the high pressure air at the high pressure stage port 48 with a relatively stable rate into the cavity 46.

The air flow mixing apparatus 30 preferably includes an ejector 50 profiled as a venturi tube and mounted on the segment of the pipeline 44 within the cavity 46. The ejector 50 is a conventional device used to boost a low pressure stream to higher pressure streams, thereby effectively using available energy without waste. The ejector 50 includes a secondary flow inlet 52 and an outlet 54. The secondary flow inlet and outlet 52, 54 are connected to the segment of the pipeline 44 in series, the ejector 50 thereby forming part of the pipeline 44, and thus part of the air flow path 34, in order to allow the air flow extracted from the low pressure stage port 42 to flow therethrough to be supplied to the pressurized area 36 of the engine.

The ejector 50 further includes a motive flow inlet 56 which preferably includes a calibrated nozzle in fluid communication with the cavity 46 in order to allow the high pressure air filled within the cavity 46 to enter the ejector 50. In such a configuration, high pressure air from a stage of the high pressure compressor assembly 22 can be extracted at the high pressure stage port 48 and added to the low pressure air flow through the air flow path 34 without any additional pipelines.

Due to the engine high pressure compressor ratio, the expansion ratio of the high pressure air flow in the calibrated nozzle (motive flow inlet 56) ensures a steady hot motive air flow into the ejector 50 under any engine operating regime, and this steady hot motive air flow is not perturbed by pressure changes of the low pressure air flow in the air flow path 34. On the other hand, as previously discussed, the pressure of the low pressure air flow delivered at the low pressure stage port 42 varies within the engine operation regime. Small reductions in pressure of the low pressure air flow delivered at the low pressure stage port 42, result in large reductions in the low temperature and low pressure air flow delivered into the pressurized area 36 of the engine. Hence, at low engine power, the air flow delivered to the pressurized area 36 originates mainly from the high pressure source (high pressure stage port 48) while at high power of engine operation, the air delivered to the pressurized area is a mixture of high pressure and low pressure air. Therefore, the ratio of energy distributed by the high temperature and high pressure air into the mixed air flow varies when engine operating conditions vary. Nevertheless, the mixture of the high and low pressure air always has a temperature intermediate to the high and low temperatures of the respective high pressure and low pressure air and a pressure intermediate to the high and low pressures thereof.

The motive flow inlet 56 has a nozzle dimensioned such that the ejector 50 delivers the mixture of the high and low pressure air that provides the required temperature of the pressurized area 36 when the engine is operating at a high power. The low temperature and low pressure air flow will decrease at low power and thus the high temperature and high pressure air contribution will increase. Therefore, a ratio of energy distributed by the added high pressure air flow into the mixture of the high and low pressure air, varies to compensate for variation of the low pressure air flow delivered from the low pressure stage port 42, thereby reducing variations in the intermediate temperature of the mixed pressurized air to be supplied to the pressurized area 36 when the temperature of the low pressure air flow extracted from the low pressure stage port 42 varies.

Besides functioning as an air flow mixing apparatus, the ejector 50 also attenuates perturbations of the low pressure air flow occurring at a constant engine speed. Such perturbations can be caused by customer bleed air flow rate increases or the Handling Bleed Off Valve (HBOV) opening. Any perturbation that reduces the air pressure and temperature delivered by the low pressure stage port 42, results in a reduced low pressure air flow rate into the ejector 50. As previously discussed, the energy provided by the high pressure air through the motive inlet 56 at an increased proportion relative to the total energy of the mixed air flow, results in both temperature and pressure gain in the ejector 50. The required degree of attenuation is preferably obtained by the effective mixing length of the ejector.

Figure 4:
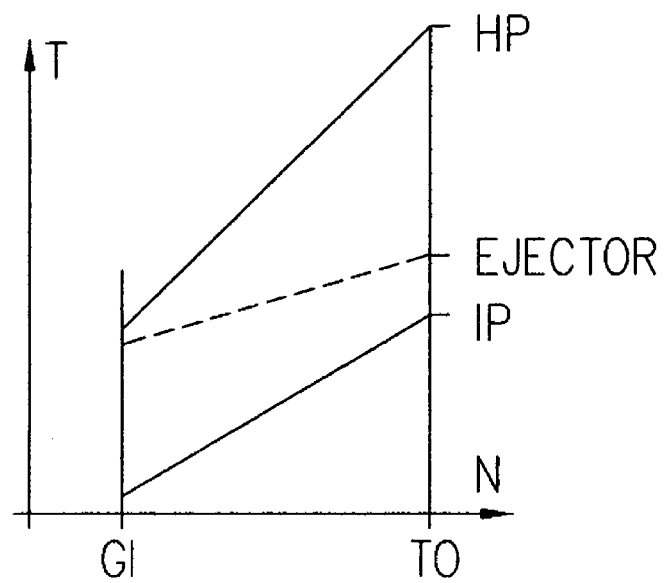
FIG. 4 is a chart illustrating air temperatures delivered by high pressure, low pressure ports and an ejector in the engine operation range according to the embodiment of FIG. 2.

FIG. 4 illustrates in chart form, the temperature changes at the high pressure stage port 48 (indicated by HP), low pressure stage port 42 (indicated by IP) and the output of the ejector 50 within the entire engine operating regime, from ground idling (indicated by GI) to taking off conditions (indicated by TO), in a temperature (indicated by T) and engines speed (indicated by N) coordinate system. FIG. 4 clearly illustrates that variations in the temperature at the output of the ejector 50 are much smaller than temperature variations at the respective high pressure stage port 48 and the low pressure stage port 42 when engine operating conditions change.

Figure 5:
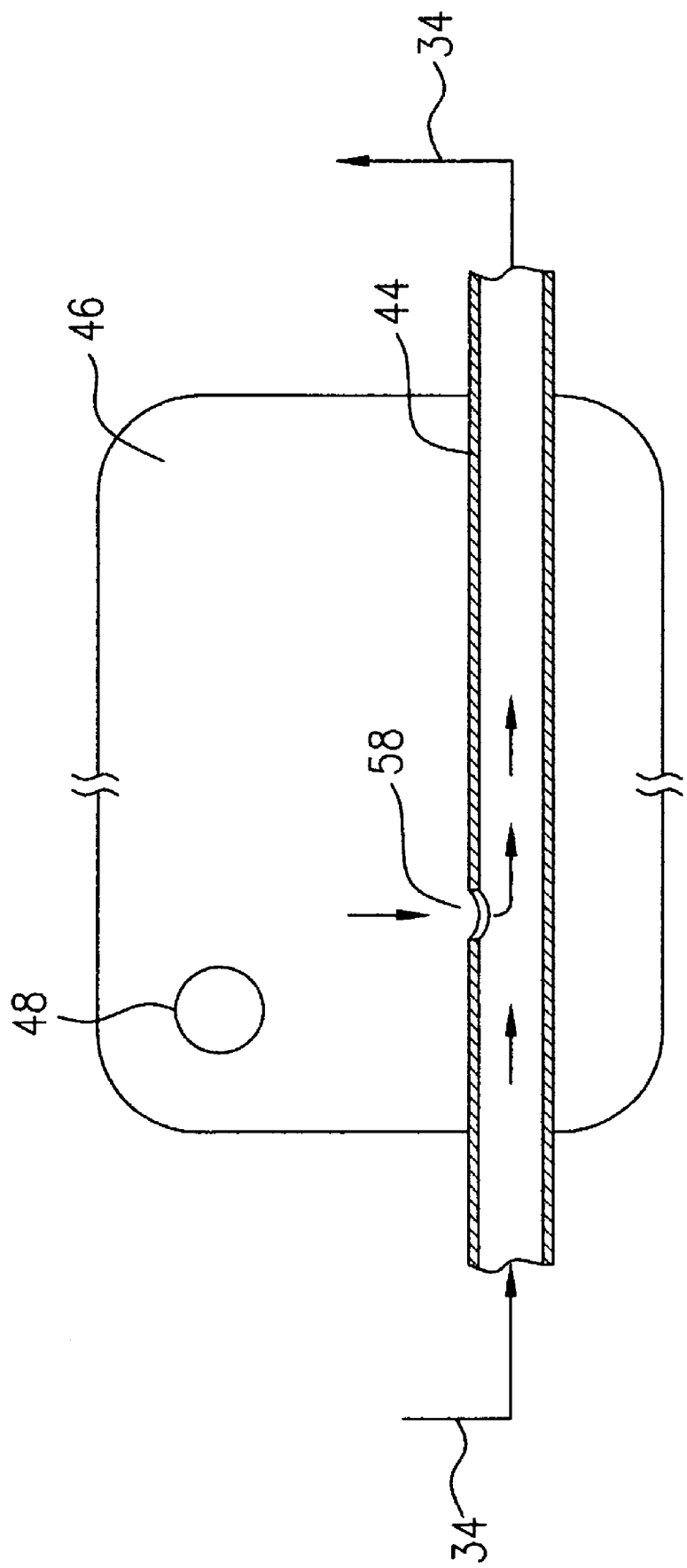
FIG. 5 is a schematic illustration showing another embodiment of the present invention illustrated in FIG. 1.

In accordance with another embodiment of the present invention illustrated in FIGS. 2 and 5, the ejector 50 in the previous embodiment is eliminated, and instead a calibrated hole 58 is defined in the segment of the pipeline 44 extending through the cavity 46. The calibrated hole 58 functions as the motive flow inlet 56 of the ejector 50 of FIG. 3 to introduce the high pressure air filled in the cavity 46 at a substantially stable rate, into the segment of the pipeline 44. Thus, a part of the segment of the pipeline 44 downstream of the calibrated hole 58 functions as an air flow mixing apparatus, similar to the ejector 50 of FIG. 2 in order to produce a mixed air flow having the relatively stable intermediate temperature and pressure required in the pressurized area 36 of the engine.

Adjustment of the location of the calibrated hole 58 along the segment of the pipeline 44 within the cavity 46 will affect the intermediate temperatures of the mixed air flow delivered through the air flow path 34 into the pressurized area 36 of the engine when the low pressure air flow through the segment of the pipeline 44 is unchanged.

Heat exchange occurs between said segment of the pipeline 44 and the cavity 46 because the temperature of the cavity 46 (the temperature of the high pressure air) is higher than the temperature of said segment of the pipeline 44. However, said segment of the pipeline 44 has different temperatures at the upstream and downstream portions with respect to the location of the calibrated hole 58. The temperatures of the upstream portion are mainly affected by the low temperature of the low pressure air extracted from the low pressure stage port 42 and the temperature of the downstream portion is mainly affected by the intermediate temperature of the mixed air flowing therethrough. Therefore, the heat exchange rates of the respective upstream and downstream portions of the segment of the pipeline 44 are different.

The location change of the calibrated hole 58 varies the affected heat exchange contact areas at the different heat exchange rate portions, thereby affecting the resultant intermediate temperature of the mixed air flow eventually delivered into the pressurized area 36 of the engine. For example, the calibrated hole 58 moved to a downstream position will increase the heat exchange at the high exchange rate at the upstream portion of the segment of the pipeline 44 and will reduce the heat exchange at the relatively low heat exchange rate at a downstream portion of the segment of the pipeline 44, resulting in more heat gain of the segment of the pipeline 44 within the cavity 46 and thus higher intermediate temperature of the mixed air flow delivered to the pressurized area 36 of the engine.

In contrast to the conventional twin-source air systems using variable geometry ejectors, the present invention advantageously uses a fixed geometry flow mixing apparatus as a temperature control device for the twin-source air system. Therefore, there are no moving parts, control systems or valves needed for effective functioning, and thus no servicing is required. The present invention by advantageously positioning the flow mixing apparatus within a high pressure cavity eliminates the need for additional piping and thus reduces the high pressure flow temperature variations. The resultant relatively stable temperature of the pressurized area alleviates transient thermal stresses in the engine components and transient rubbing (pinch point) in the non-contact air and air/oil seals.

The above description is meant to be exemplary only, and one skilled in the art will recognize that changes may be made to the embodiments described without departure from the scope of the invention disclosed. For example, the cavity can be any cavities defined within the engine which are in fluid communication with a high pressure source of air of the engine other than the exemplary chamber surrounding a combustor of the engine. The ejector position may be changed along the segment of pipeline within the cavity, similar to the adjustment of the calibrated hole defined in the pipeline, in order to adjust the heat exchange between the pipeline and the surrounding hot cavity. The segment of pipeline extending through the hot air cavity may be entirely or partially insulated, and a check valve may be installed in the motive flow inlet upstream of the injection point. Individual ejectors may be installed and calibrated for each pressurized area of the engine, not limited to the space defined by labyrinth seals. The flow mixing apparatus of the present invention may be combined with heat exchangers to further improve the effectiveness of the arrangement. Still other modifications which fall within the scope of the present invention will be apparent to those skilled in the art, in light of a review of this disclosure, and such modifications are intended to fall within the appended claims.

The invention claimed is:

1. A passive pressurizing air system for a gas turbine engine comprising:
a flow path for directing an air flow having a first temperature and a first pressure from a pressure stage of a compressor of the engine to a pressurized area of the engine, the flow path extending through a cavity having a high pressure stage port therein, the high pressure stage port filled in the cavity with pressurized air from a different stage of the compressor having a second temperature and a second pressure greater than the respective first temperature and first pressure, the cavity being defined by a casing immediately surrounding a combustor of the engine; and
an air flow mixing apparatus located within the cavity, the apparatus communicating with the flow path intermediate the pressure stage and pressurized area, the apparatus also communicating with the cavity for adding the pressurized air from the cavity into the flow path to provide a mixed air flow having a temperature and a pressure intermediate to the first and second temperatures and the first and second pressures, the mixed air flow flowing through a pipe that connected to the flow mixing apparatus inside the cavity to the components downstream of a turbine assembly.

2. The system as defined in claim 1 wherein the apparatus comprise a calibrated inlet hole-defined in a side wall of a pipe forming a section of the flow path located within the cavity.

3. The system as defined in claim 1 wherein the apparatus comprise an ejector mounted on a section of the flow path located within the cavity surrounding the combustor of the engine.

4. The system as defined in claim 3 wherein the ejector comprises a motive flow inlet thereof in fluid communication with the cavity, a secondary flow inlet and an outlet thereof connected to the flow path, the ejector thereby forming a part of the flow path.

5. The system as defined in claim 1 further comprising:
a low pressure source of air having said first temperature and pressure;
a high pressure source, of air having said second temperature and pressure; and
wherein the apparatus includes an ejector as a part of the flow path, the ejector being located in a cavity, the cavity being in fluid communication with the high pressure source of air, the ejector having a motive flow inlet in fluid communication with the cavity, a secondary flow inlet connected to the low pressure source of air and an outlet connected to the pressurized area of the engine for delivery of a mixed air flow from the high and low pressure sources of air thereto.

6. The system as defined in claim 5 wherein the ejector is a fixed geometry ejector.

7. The system as defined in claim 1 wherein the apparatus comprises a fixed geometry ejector.

8. The system as defined in claim 5 wherein the ejector is installed on a pipeline segment of the flow path, the pipeline segment extending into the cavity to direct the air flow from the low pressure source of air into the secondary flow inlet of the ejector.

\* \* \* \* \*